July 11, 1950
I. W. DOYLE ET AL
2,514,991
CAMERA HAVING FILM WINDING AND
SHUTTER SETTING MECHANISM
Filed Oct. 22, 1945
7 Sheets-Sheet 7
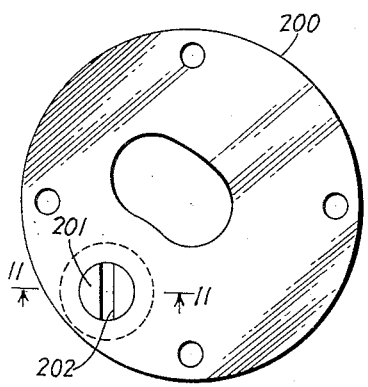
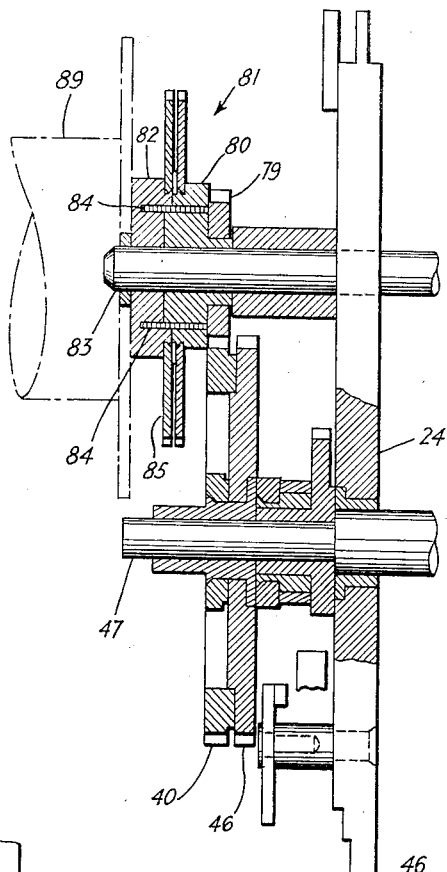
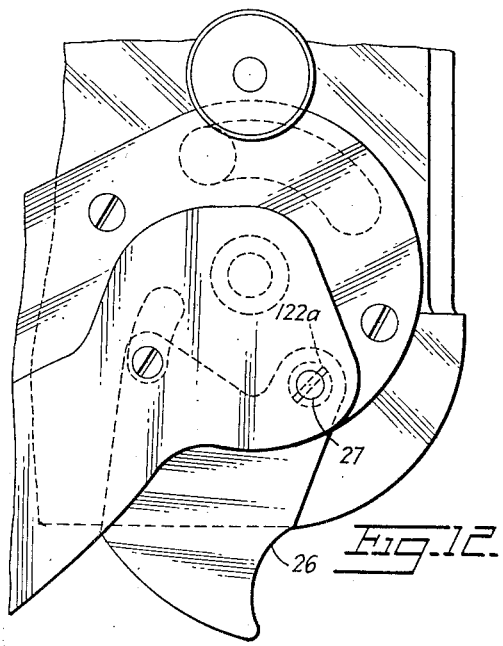
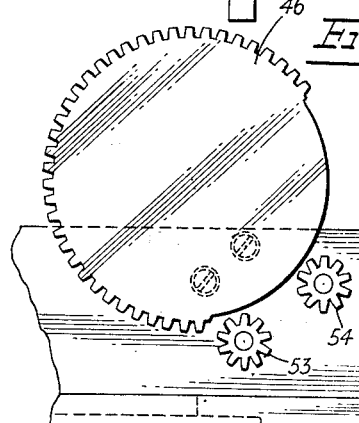
INVENTORS
Irving W. Doyle
BY Carl V. Johnson
Blair, Curtis & Hayward
ATTORNEYS Patented July 11, 1950

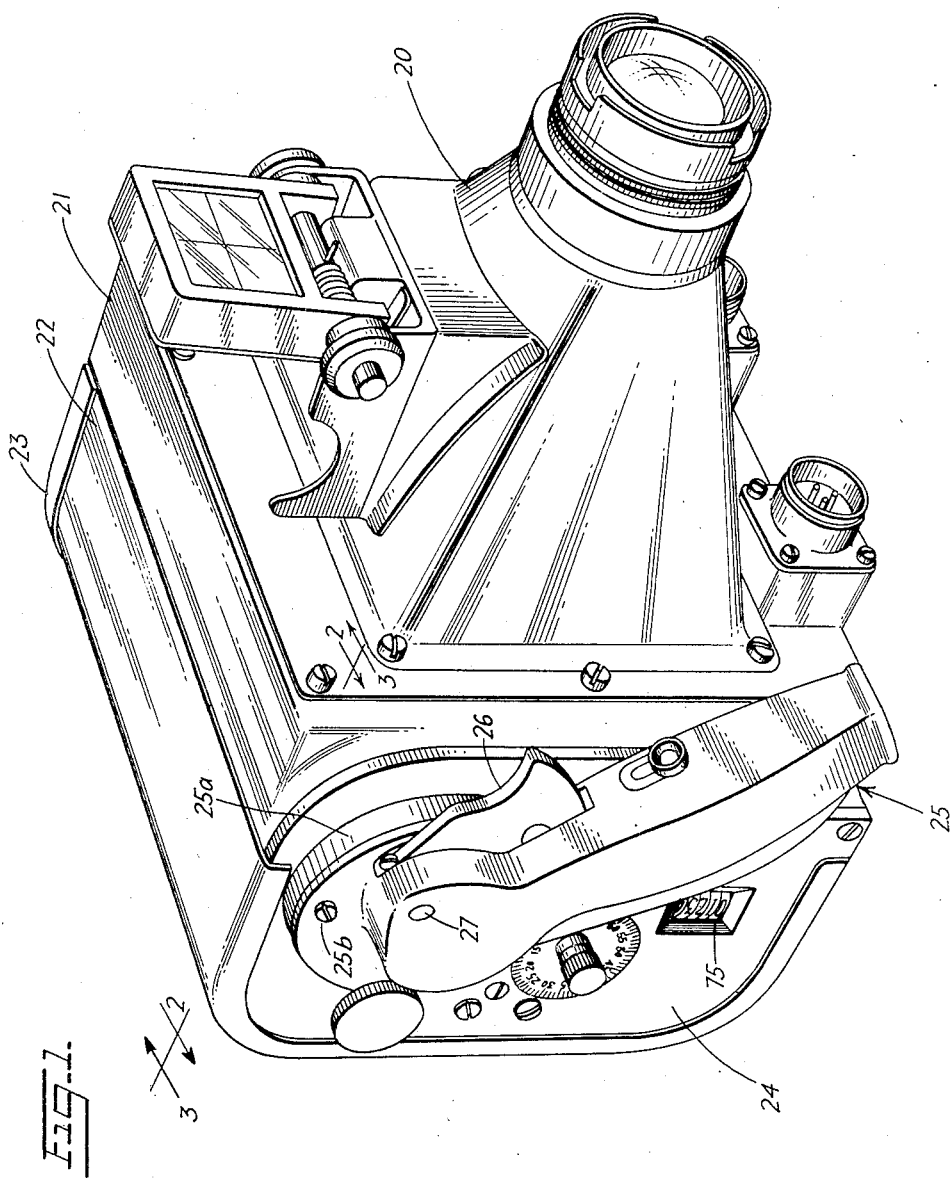

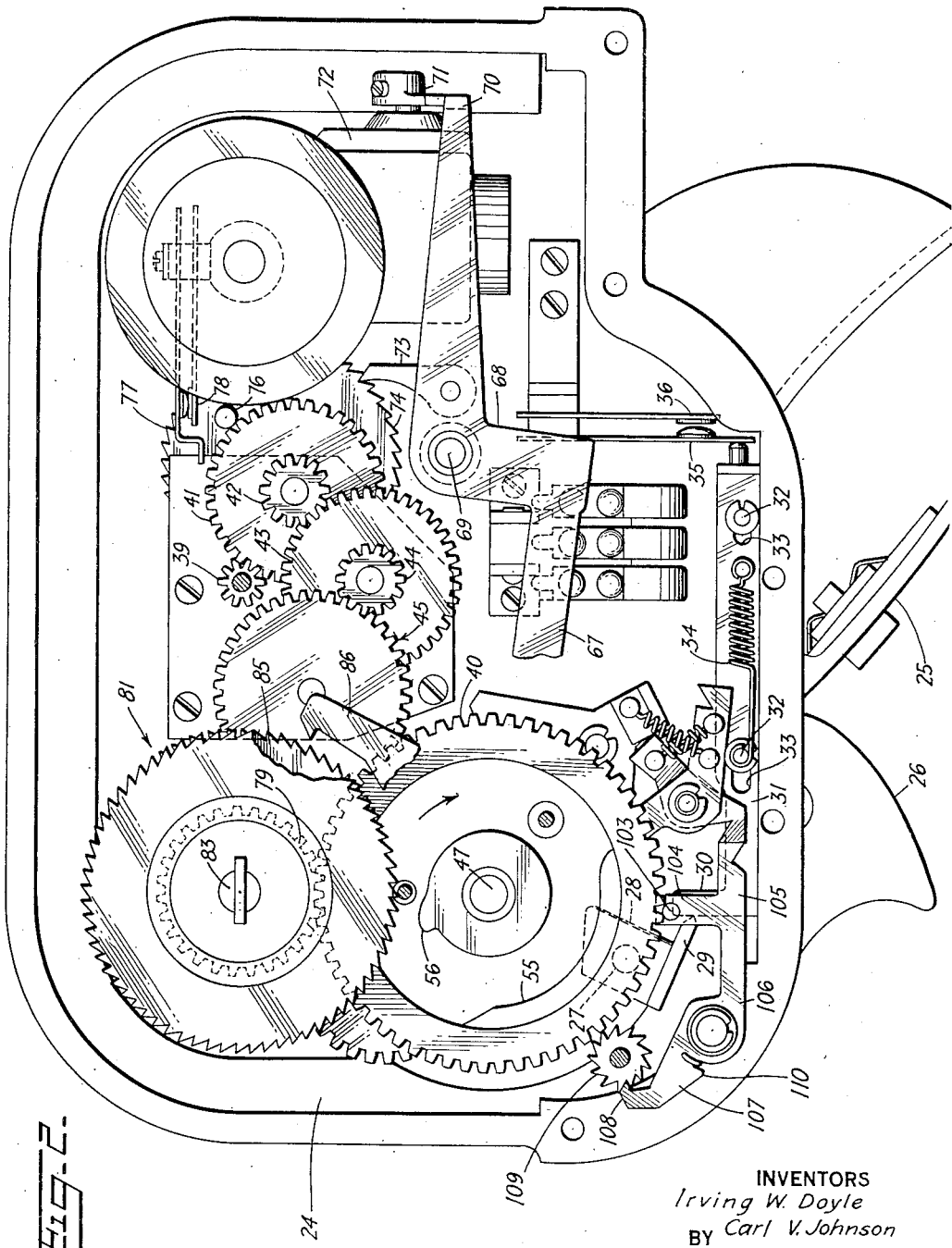

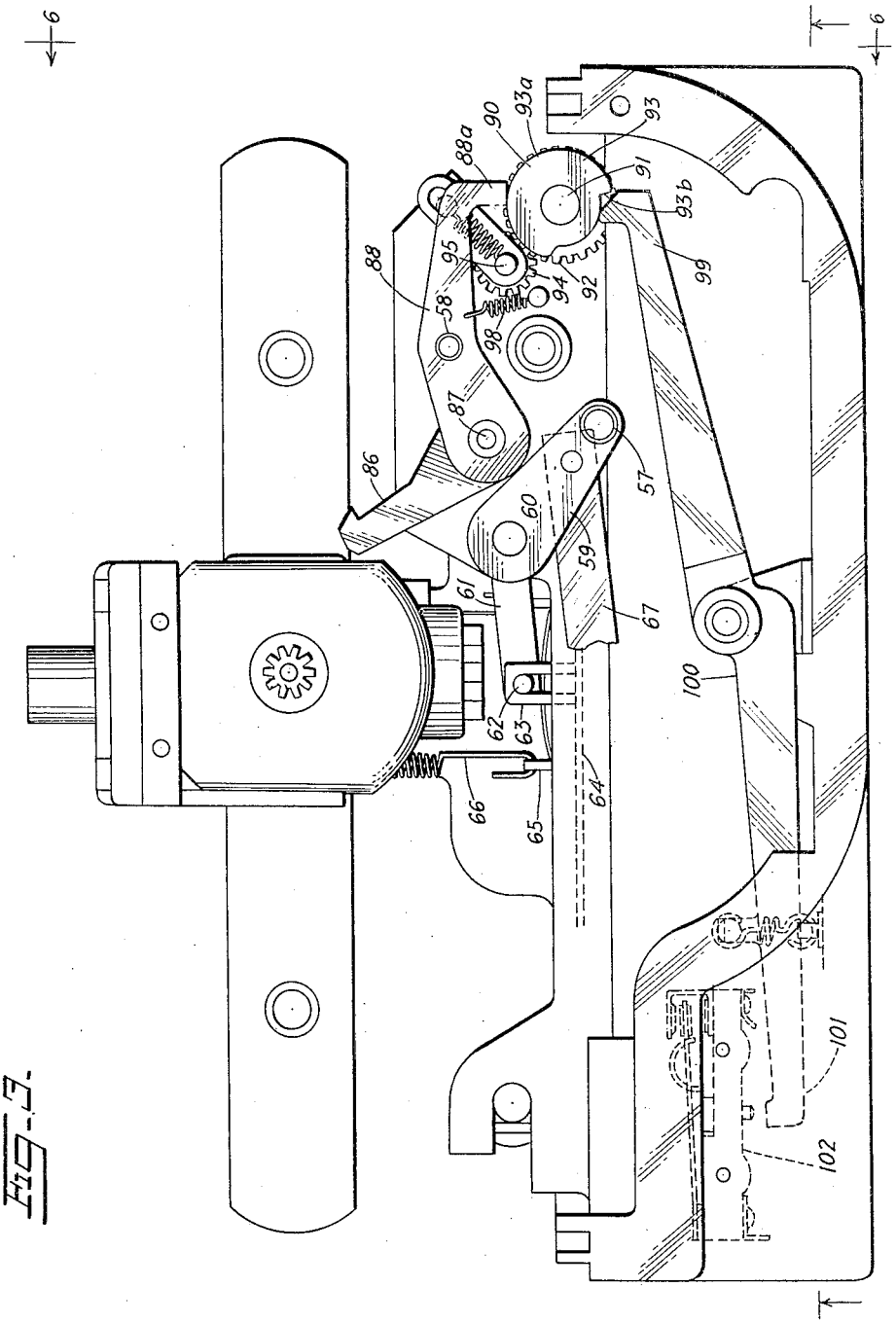

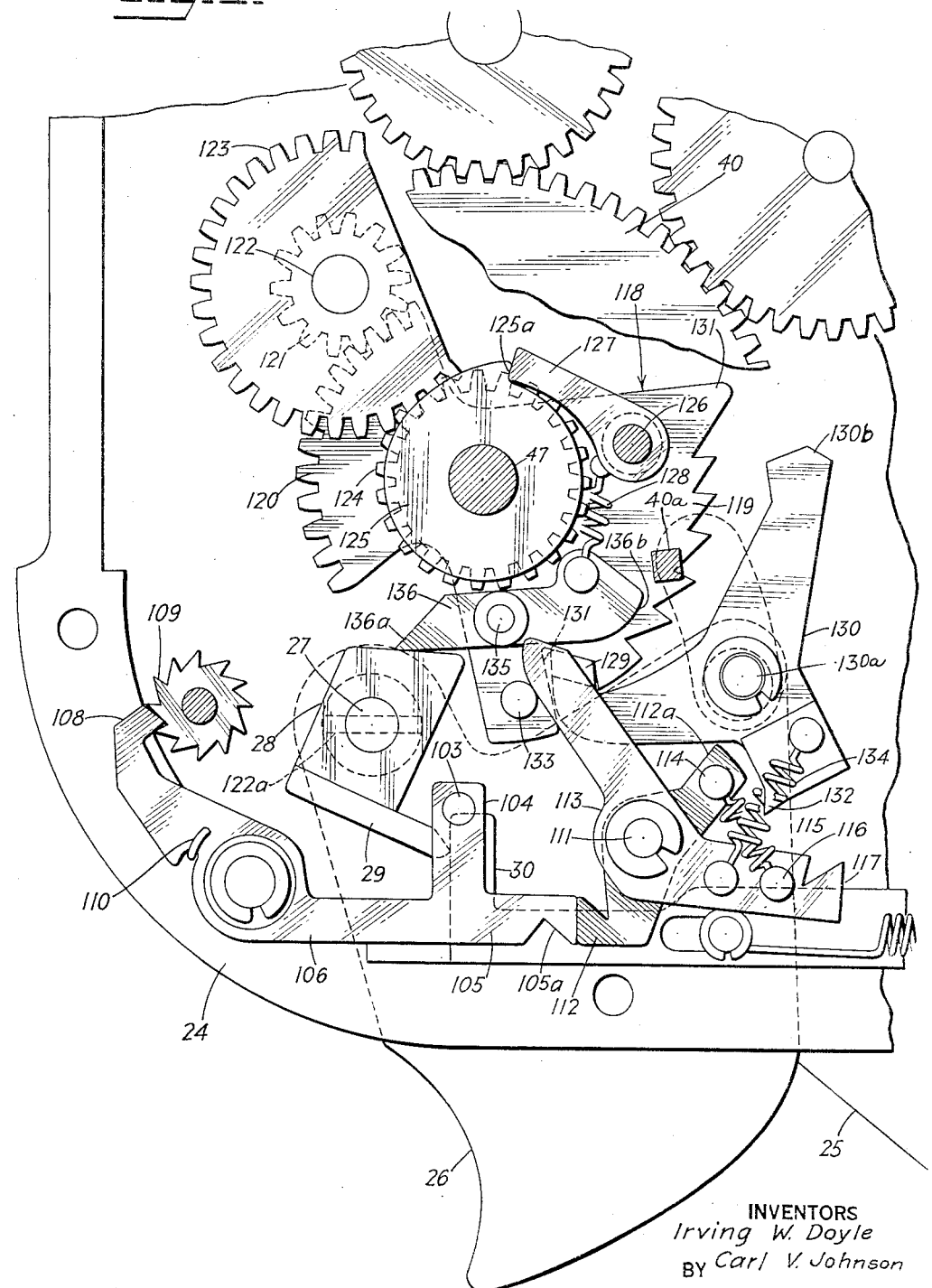

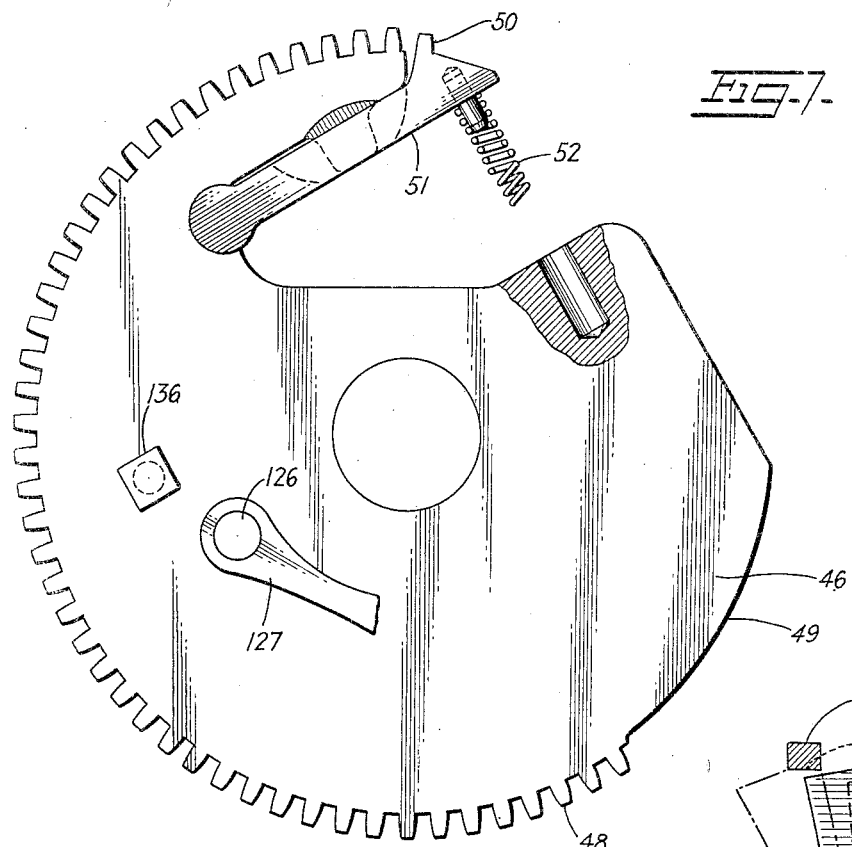
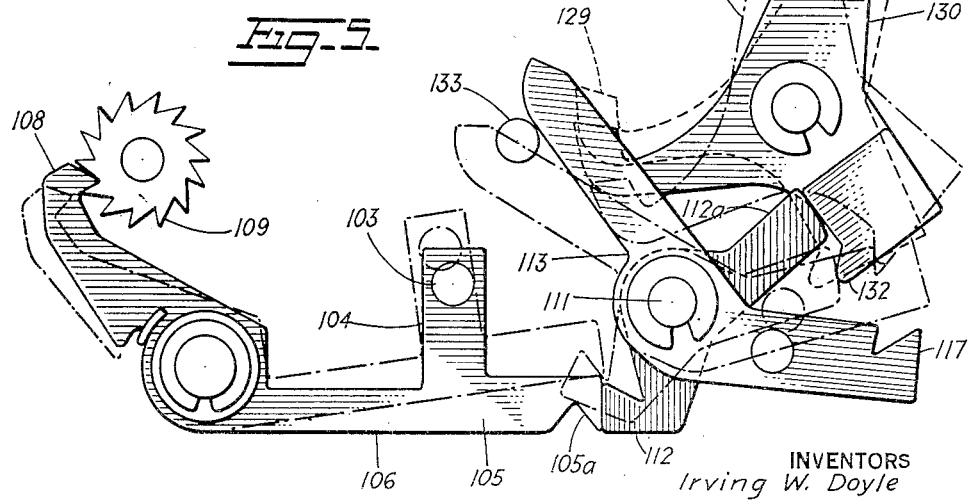

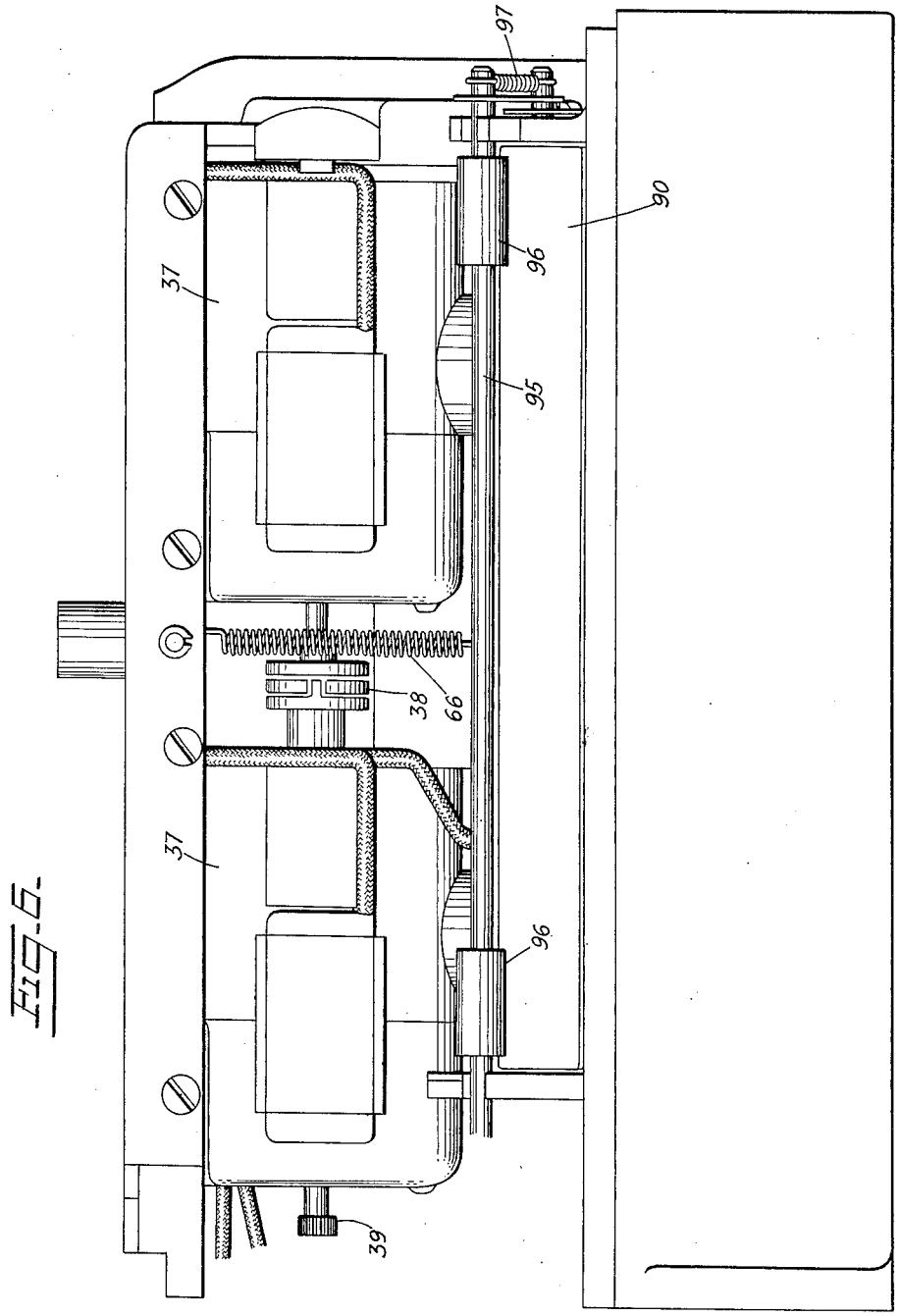

2,514,991

UNITED STATES PATENT OFFICE 2,514,991

CAMERA HAVING FILM WINDING AND SHUTTER SETTING MECHANISM

Irving W. Doyle, Massapequa, and Carl V. Johnson, Kew Gardens, N. Y., assignors to Fairchild Camera and Instrument Corporation, Jamaica, N. Y., a corporation of Delaware Application October 22, 1945, Serial No. 623,620

4 Claims. (Cl. 95—31)

This invention relates to a camera, and more particularly to a camera which may be operated by hand or by a motor.

It is an object of this invention to provide a camera for exposing strip film which may be manually operated with great rapidity. Another object is to provide a camera which may be electrically operated in a position remote from the operator. Another object is to provide a camera of the above nature which is relatively light, but extremely rugged and well able to withstand conditions of extended, rigorous use. Another object is to provide a camera of the above nature adaptable for aerial reconnaissance work at low altitude and high speed, as well as for operation at high altitude and relatively slower air speeds. Another object is to provide a camera of the above nature which may readily be adapted for manual or electrical operation. Other objects will be in part apparent, and in part pointed out hereinafter.

In the drawing,

Figure 1 is a perspective view of the camera in condition for manual operation;

Figure 2 is an enlarged elevation taken substantially along the line 2—2 of Figure 1;

Figure 3 is an enlarged elevation taken substantially along the line 3—3 of Figure 1;

Figure 4 is an enlarged view of a portion of the operating mechanism shown in the lower left-hand portion of Figure 2, certain parts being shown in section and others broken away;

Figure 5 shows portions of the mechanism of Figure 4 in different operative positions;

Figure 6 is a fragmentary side view of the structure shown in Figure 3, as viewed along the line 6—6;

Figure 7 is a substantially enlarged view partially in section of a mutilated gear forming part of the shutter operating mechanism;

Figure 8 is a fragmentary top plan view of a portion of the mechanism shown at the left-hand side of Figure 2;

Figure 9 is a side view of the focal plane shutter of the camera illustrating its relationship to the mutilated gear shown in Figure 7;

Figure 10 is an elevation of a cover plate which replaces the operating handle when the camera is electrically operated;

Figure 11 is a fragmentary section taken along the line 10—10 of Figure 10; and, Figure 12 is a fragmentary elevation showing the connection on the trigger for the tripping mechanism.

Similar reference characters refer to similar parts throughout the various views of the drawing.

As shown in Figure 1, the camera comprises a cone 20, a focal plane shutter 21 and a magazine 22 over which a detachable cover 23 is fitted. On one side of magazine 22 is a plate 24 which, as is shown in Figure 2, supports a portion of the operating mechanism in the camera, which will be described in detail hereinafter. The camera may be operated electrically or manually, the electrical operation being accomplished in the manner now to be described.

Pivotally mounted on plate 24 is a handle, generally indicated at 25, carrying a trigger 26 pivoted on a pin 27. Manual operation of the camera is effected by trigger 26, as will be described below. Handle 25 is directly supported by a plate 25a, secured to camera plate 24 as by screws 25b, so that when it is desired to operate the camera electrically, screws 25b may be unloosened to permit removal of handle 25 and plate 25a. Preferably under such circumstances, a cover 200 (Figure 10) is provided for attachment to the camera by screws 25b. This cover carries a plug 201 having a slot 202 (see Figure 11) formed therein which, when the cover is in place, interengages with a key 122a on pin 27 (Figure 12) to hold the pin in tripping position. Under such circumstances, operation of the camera is controlled by any suitably disposed on-off switch in the camera circuit which, when on, causes the camera to operate in "run away" fashion. Thus it follows that the camera is readily installable remotely from the operator and in a position where space is limited.

Electrical operation of the camera will first be described. As shown in Figure 2, the inner end of pin 27 has fastened thereto a plate 28 which carries a finger 29, the end of this finger bearing against an upstanding foot 30 formed on one end of a slide 31 reciprocably mounted on plate 24 by means of a pair of pins 32 extending through slots 33 in the slide. Slide 31 is biased to the left, as viewed in Figure 2, by a spring 34 so as normally to be in the position shown. It may now be seen that when the camera is arranged for electrical operation, i. e. when pin 27 is in tripping position, finger 29 holds slide 31 to the right to engage a pair of contacts 35 and 36, closing a circuit to the camera motors 37 (Figure 6).

Motors 37 are coupled as at 38, and together drive a pinion 39 (see also Figure 2) which pinion drives a main gear 40 through a reduction train comprising gears 41, 42, 43, 44 and a pair of ratchet connected gears, generally indicated at 45, which will be described below. As will hereinafter appear, a complete cycle of operation of the camera occurs during one revolution of gear 40.

Fastened to gear 40, as shown in Figure 8, is a shutter winding gear 46, both of these gears being mounted on a shaft 47 carried by plate 24. Gear 46 is of a mutilated type, and as shown in Figure 7, includes a toothed portion 48 and a smooth portion 49, the last tooth 50 of the toothed portion being formed at one end of an arm 51 pivotally carried by the body of the gear, and under a counterclockwise bias by a spring 52. This type of gear is provided to assure an effective driving connection to the shutter driving gears without jamming. These shutter driving gears are indicated at 53 and 54 in Figure 9, and it will suffice to note that by these gears the shutter and capping curtains (not shown) are driven in the manner described in our copending application Serial No. 594,346, filed May 17, 1945, which issued on July 22, 1947, as Patent No. 2,424,439.

When the mechanism is in the position shown in Figure 2, the camera is in condition to be tripped, i. e. the film and shutter have been wound and the pressure plate described hereinafter is in position to hold the film in fixed position in the focal plane. When the trigger is pulled, as heretofore described, and motor contacts 35 and 36 close, main gear 40 rotates clockwise. Carried by this gear are a pair of cams 55 and 56 which respectively engage followers 57 and 58 (Figure 3). Follower 57 controls the pressure plate, follower 58 controlling the film winding mechanism. Follower 57 is carried on one end of a lever 59 fastened to a stud shaft 60, to which shaft is also attached an arm 61 carrying at its free end a pin 62. Pin 62 engages a U-shaped bracket 63 which is attached to the pressure plate 64. Also fastened to the pressure plate is a lug 65 to which is secured one end of a spring 66, this spring tending to pull the pressure plate upwardly. This upward bias of the pressure plate is transmitted through arms 61 and 59 to follower 57, the follower accordingly being at all times held against cam 55 (Figure 2). Thus as the cam rotates, follower 57 (Figure 3) moves to the outer rim or greater diameter of the cam, arms 59 and 61 accordingly rocking clockwise, as viewed in Figure 3, so as to permit spring 66 to raise pressure plate 64 away from the focal plane to permit movement of the film thereover during the film feeding portion of the cycle.

Pivotally attached to lever 59 is a link 67, the other end of which is in the form of a bell crank 68 (Figure 2) pivoted on a stud 69. The free end 70 of bell crank 68 is engageable with the operating arm 71 of a counter 72 which is actuated once for each complete operative cycle of the camera, this counter being provided to count the total life cycle of the camera. Bell crank 68 also carries a pawl 73 associated with a ratchet 74, which ratchet operates another counter 75 shown in Figure 1. Ratchet 74 (Figure 2) also carries a pin 76 which is so placed in relation to a contact arm 77 that it forces this contact away from another contact 78 to break the motor circuit after a predetermined number of operative cycles, thus to disable the camera when, for example, the film supply is exhausted.

Referring back to Figure 2, it may be seen that main gear 40 meshes with a gear 79 (see also Figure 8) which is fastened to one element 80 of a spring clutch generally indicated at 81. The other element 82 of this clutch is fastened in any suitable manner to a film spool pivot 83 so that when clutch 81 is engaged, as will be described, pivot 83 is driven by gear 40 by way of gear 79. Gear 79 and clutch element 80 are freely rotatable on spool pivot 83 so that the spool pivot can be rotated only when the clutch is engaged. Clutch 81 includes a wire spring 84 which is associated with both of the clutch elements and which effects a driving connection therebetween when a ratchet 85, carried by clutch element 82 is unrestrained. This ratchet 85 is controlled by a pawl 86 (Figures 2 and 3) which is fastened to and rocked by a shaft 87 (Figure 3). Also attached to shaft 87 is an arm 88 which carries cam follower 58 previously referred to. It may now be seen that as gear 40 (Figure 2) rotates, cam 56 passes under follower 58 (Figure 3) lifting the follower and accordingly rocking arm 88 and pawl 86 counterclockwise, as viewed in Figure 3, and clockwise, as viewed in Figure 2, thus moving the pawl out of engagement with ratchet 85, which causes clutch 81 to engage. With the clutch engaged, spool pivot 83 is driven, as heretofore described, causing film spool 89 to rotate, and thereby feed a section of unexposed film under the pressure plate which, as described before, is raised during this portion of the cycle.

To assure the feed of a predetermined length of film for each cycle of operation, a metering roller 90 (Figure 3) is provided (see Figure 6). Referring back to Figure 3, metering roller 90 is mounted on a shaft 91, which shaft also carries a gear 92 and a cam 93. Gear 92 meshes with a pinion 94 fastened to a shaft 95, which shaft, as shown in Figure 6, carries a pair of pressure rolls 96, which are pulled against metering roller 90 by a spring 97. Thus the film is held firmly against the metering roller, causing the metering roller to rotate as the film is wound on spool 89 (Figure 8) as described above. Rotation of metering roller 90 (Figure 3) causes cam 93 to rotate also. This cam includes a dwell 93a and a stop shoulder 93b which control arm 88 by way of a right angle finger 88a which rides on cam 93. At the beginning of the cycle, cam stop 93b rests against arm finger 88a, thus holding the cam and accordingly the metering roller 90 against movement. When the camera is tripped and arm 88 is rocked counterclockwise, as viewed in Figure 3, in the manner described above, finger 88a is drawn out of the path of cam stop 93b so that the cam may rotate as the moving film drives metering roller 90. The arm finger may then ride on dwell 93a of the cam, the arm being under a clockwise bias by reason of a spring 98, the cam dwell thus holding pawl 86 out of engagement with ratchet 85 (Figure 2) to maintain clutch 81 in engagement a sufficient length of time to feed the correct amount of unexposed film over the focal plane aperture. When cam finger 88a (Figure 2) drops off cam dwell 93a, pawl 86 reengages ratchet 85 (Figure 2) thus disengaging clutch 81 and stopping the film feed. Thus it follows that metering roller 90 (Figure 2) through its cam 93, accurately meters the correct amount of film for each cycle of operation.

Cam 93 has an additional function. As it rotates, it engages on end 99 of a pivoted lever 100, the other end 101 of which closes a switch 102 which completes the circuit to a signal light (not shown) to indicate to the operator of the camera that film is being fed.

Thus it appears that when trigger 26 (Figure 1) is depressed, the operative cycle of the camera is initiated and an exact predetermined amount of film is automatically fed into exposure position.

Trigger controller finger 29 (Figure 2) also acts to effect operation of the focal plane shutter 21, as follows: finger 29, upon counterclockwise movement, as viewed in Figure 2, engages under a pin 103 carried at the end of a finger 104 formed on one arm 105 of a bell crank 106. The other arm 107 of this bell crank has formed on its end a pawl 108 which normally engages a shutter pinion 109. When the bell crank is rocked, however, pawl 108 and shutter pinion 109 are disengaged and the focal plane shutter is thereby tripped. Thus during electrical operation of the camera, shutter pinion 109 is always disengaged by pawl 107 so that the shutter is successively set and released synchronously with the feeding of film, as long as the camera circuit remains closed.

As indicated above, the camera may be operated manually by handle 25. Assuming that the camera is in condition for exposure operation, operation of trigger 26 (Figure 2) rocks pin 27 and accordingly finger 29. As noted above, when the finger is rocked, it engages pin 103 to rock arm 105 counterclockwise. This movement of arm 105 sets into operation a number of elements which will now be described. Camera plate 24 (Figure 4) has secured thereto a pin 111, which pivotally supports a catch 112 and a locking arm 113. Catch 112 includes a projection 112a, which carries a pin 114 to which is attached one end of a spring 115. The other end of spring 115 is fastened to a pin 116 attached to and extending from a catch 117, forming one end of locking arm 113. When the camera is ready to be tripped, the parts are locked in the position shown in Figure 4, so that the tension of spring 115 exerts a clockwise bias on catch 112. Thus when arm 105 is rocked counterclockwise by tripping of the trigger, its right-hand end clears the end of hook 112, whereupon the hook engages in a notch 105a in the end of arm 105 to hold both the catch and the arm in tripped position, as shown in dot-dash lines in Figure 5. Of course, this counterclockwise movement of arm 105 (Figure 4) causes pawl 108 to release shutter pinion 109 and consequent operation of the focal plane shutter, as hereinbefore described. When it is desired to feed a new length of film into the focal plane and reset the shutter, setting handle 25 is first rocked clockwise, as viewed in Figure 4. Handle 25 is keyed to shaft 47, to which is attached a ratchet gear member generally indicated at 118, having a ratchet 119 and a gear sector 120. Thus it follows that the ratchet and gear sector are rotated when handle 25 is rocked clockwise.

Gear sector 120 meshes with a small pinion 121 which is fastened to a shaft 122 rotatably mounted in camera plate 24. Also secured to shaft 122 is a gear 123 which engages with a gear 124 which, together with a cam 125 to which it is fastened, are freely mounted on shaft 47. A pin 126 is fastened to the underside of mutilated gear 46 which is fastened to main drive gear 40, and on this pin is rotatably mounted a pawl 127 which is biased counterclockwise by a spring 128 so that the pawl is always held against the periphery of cam 125, thus to be in a position to be engaged by a shoulder 125a on the cam. It may be seen that when the cam is rotated by the gear train described, its direction of rotation is clockwise, as viewed in Figure 4; thus the cam shoulder pushes against pawl 127, and accordingly rotates drive gear 40 clockwise. The ratio of the gear train described is such that travel of handle 25 through an arc of less than 360° completes one revolution of main drive gear 40. This rotation of the drive gear effects operation of the film feeding mechanism to feed the proper amount of unexposed film into exposure position in the focal plane, as described hereinabove.

As handle 25 is rocked clockwise, which is the first direction of movement thereof to reset the camera, ratchet 119 also rotates clockwise, forcing the end 129 of a locking arm 130 out of a notch 131 formed in the ratchet, arm 130 being pivotally mounted on a pin 130a carried by plate 24. As the ratchet continues to rotate, the locking arm end 129 is in the full line position shown in Figure 5, wherein it over-rides the ratchet teeth until the last tooth 131 of the ratchet engages the end of the locking arm, forcing it to an extreme counterclockwise position (the dot-dash position in Figure 5), at which point catch 117 on arm 113 engages with a lip 132 on locking arm 130. With the locking arm in this extreme position, the pawl or stop end 129 (Figure 4) of the locking arm is free of the teeth on ratchet 119 so that the ratchet may be moved counterclockwise upon similar movement of handle 25. However, as this return movement of the handle and ratchet nears its end, a pin 133 on ratchet 119 engages arm 113 and rocks it clockwise, forcing its catch 117 out of engagement with lip 132 on locking arm 130. It should be noted at this point that a spring 134, having its opposite ends attached respectively to arm 113 and locking arm 130 tends to maintain the two arms in engagement.

Thus when catch 117 and lip 132 become disengaged, spring 134 rocks locking arm 130 clockwise, causing the reentry of pawl 129 into notch 131 of the ratchet. It will be recalled that prior to this movement of locking arm 130, catch 112 had been rocked clockwise to engage under arm 105 (see dot-dash position in Figure 5) thus holding this arm in its counterclockwise position. Upon the final clockwise movement of locking arm 130, as described, however, its lip 132 (Figure 4) engages under pin 114 on the end 112a of catch 112 and rocks the catch counterclockwise, thus to disengage its lower hooked end from notch 105a of arm 105, which permits spring 110 to rock arm 105 clockwise, and accordingly re-engage pawl 108 with shutter pinion 109, thus locking the shutter in its set position.

The return or counterclockwise movement of ratchet 119 has an additional purpose. Pivotally mounted, as by a pin 135 on ratchet 119 is a lever 136, the end 136a of which is forced against trigger plate 28 by spring 128. Prior to the engagement of this end of lever 136 with plate 28, however, the other end 136b of the lever engages the trigger plate shortly after the beginning of the return movement of ratchet 119, which causes clockwise movement of trigger plate 28 and accordingly a withdrawal of finger 29 from under pin 103, thus to permit return clockwise movement of arm 105 by spring 110 when catch 112 releases the arm. Thus it follows that the trip finger 29, and accordingly trigger 26, is automatically returned to its Figure 2 position during the return or counterclockwise movement of handle 25.

As pointed out above, stop or lock arm 130 is moved to an extreme counterclockwise position (referring to Figure 4) by the last ratchet tooth 131. Another function is accomplished by this extreme movement. As pointed out before, a relatively few degrees of movement of handle 25 and ratchet member 118 cause one complete revolution of drive gear 40. Under circumstances where the handle is moved very rapidly, substantial momentum might well be imparted to the drive gear, causing it to overrun. To preclude such overrunning, the mutilated gear 46, which is attached to main gear 40, carries a block 40a so positioned as to engage an edge 130b of locking arm 130 when the locking arm is in its extreme counterclockwise position (see Figure 5). As noted above, in the description of the electrical operation of the camera, operation of the main drive gear 40 effects rewinding of the camera shutter. Thus it follows that the camera may be tripped and reset just as rapidly as handle 25 and trigger 26 can be manipulated, with the assurance that the camera cannot be retripped until it is completely reset. In other words, the various levers, arms, stops and ratchets shown in Figure 4 are so arranged and their operations are so timed relative to the operation of mutilated gear 46 as to constitute an effective interlock which prevents tripping of the shutter during the film rewind portion of the cycle, and which prevents the feeding of anything less than a complete complement of unexposed film.

As noted above in the description of the electrical operation of the camera, the gear train shown in Figure 2, which connects motor-driven pinion 39 with main drive gear 40, includes a pair of ratchet-connected gears 45. These gears are of a conventional nature, i. e. constitute an over-drive or overrunning clutch which forms a driving connection between the motor and gear 40 during electrical operation of the camera, but which precludes operation of the gear train through rotation of gear 40 when this gear is rotated during manual operation of the camera, as described. Accordingly it follows that gear 40 is common to both the electrical and manual drives, which not only facilitates operation of the film winding mechanism but also simplifies the mechanism by which the shutter is reset.

Thus we have provided an aerial camera which fulfills the objects hereinbefore set forth in a thoroughly practical and efficient manner.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In a manually operable camera, in combination, a shutter, a shutter trip operable to trip said shutter, film winding mechanism, gear means including a mutilated gear adapted to be connected with said shutter and a drive gear connected with said film winding mechanism and operable to operate said shutter and said mechanism, a rotatable shaft on which said gears are freely mounted, a handle disposed exteriorly of said camera and connected to said shaft for rotating said shaft backwards and forwards, means connecting said shaft to said gears for operating said gear means to wind said shutter and operate said film winding mechanism when said handle is rocked in one direction, and means operated by said handle upon rocking thereof in the opposite direction for resetting said shutter trip.

2. In a manually operable camera, in combination, a shutter, a shutter trip operable to trip said shutter, film winding mechanism, gear means including a mutilated gear adapted to be connected with said shutter and a drive gear connected with said film winding mechanism and operable to operate said shutter and said mechanism, a rotatable shaft on which said gears are freely mounted, a handle disposed exteriorly of said camera and connected to said shaft for rotating said shaft backwards and forwards, means releasably connecting said shaft to said gear means for winding said shutter and operating said film winding mechanism when said handle is rocked in one direction, means operated by said handle upon rocking thereof in the opposite direction for resetting said shutter trip, and means to preclude overrunning of said drive gear and accordingly said film winding mechanism during operation thereof by said handle.

3. In a manually operable camera, in combination, a casing, a shaft rotatably mounted in said casing, a handle disposed exteriorly of said casing and connected to said shaft for rotating it forth and back, a gear attached to said shaft to rotate therewith, a second gear freely mounted on said shaft, a gear train forming a driving connection between said first and second gears so that said second gear is rotated in one direction or the other in accordance with the rotation of said first gear, a third gear freely mounted on said shaft, means forming a separable driving connection between said second and third gears whereby said second gear drives said third gear in one direction only, film winding mechanism connected to said third gear so as to be driven thereby unidirectionally only, said third gear having a stop mounted thereon, and means operatively associated with said first gear and actuated thereby upon its initial rotation to a position in the path of movement of said stop to preclude said third gear and accordingly said film winding mechanism from overrunning.

4. In a manually operable camera, in combination, a casing, a shaft rotatably mounted in said casing, a handle disposed exteriorly of said casing and connected to said shaft for rotating it forth and back, a gear attached to said shaft to rotate therewith, a second gear freely mounted on said shaft, a gear train forming a driving connection between said first and second gears so that said second gear is rotated in one direction or the other in accordance with the rotation of said first gear, a third gear freely mounted on said shaft, means forming a separable driving connection between said second and third gears whereby said second gear drives said third gear in one direction only, shutter reset mechanism connected to and operated by said third gear but unidirectionally only, a ratchet secured to said shaft to rotate therewith, shutter trip lockout mechanism in said casing, and an element on said ratchet for resetting said lockout mechanism upon rotation of said shaft and accordingly said ratchet in a direction opposite to the film winding direction of rotation.

IRVING W. DOYLE.
CARL V. JOHNSON.

REFERENCES CITED

The following references are of record in the file of this patent:

UNITED STATES PATENTS

| Number | Name | Date |
|---|---|---|
| 1,536,335 | Folmer | May 5, 1925 |
| 1,645,923 | Ohlau | Oct. 18, 1927 |
| 1,764,066 | Chamberlin | June 17, 1930 |
| 1,779,424 | Fairchild | Oct. 28, 1930 |
| 1,817,182 | Fairchild | Aug. 9, 1931 |
| 1,821,492 | Breichle | Sept. 1, 1931 |
| 1,909,597 | Thompson | May 16, 1933 |
| 2,169,001 | Mihalyi | Aug. 8, 1939 |
| 2,180,064 | Nuchterlein | Nov. 14, 1939 |
| 2,283,788 | Briechle et al. | May 19, 1942 |
| 2,358,777 | Rappleyea | Sept. 26, 1944 |
| 2,362,813 | Gorey et al. | Nov. 14, 1944 |

FOREIGN PATENTS

| Number | Country | Date |
|---|---|---|
| 20,932 | Great Britain | of 1900 |